United States Patent
Gonen et al.

(10) Patent No.: US 8,200,231 B2
(45) Date of Patent: *Jun. 12, 2012

(54) PROCESS FOR DYNAMIC ROUTING OF CUSTOMER CONTACTS TO SERVICE PROVIDERS IN REAL TIME

(75) Inventors: Shlomo Gonen, Calabasas, CA (US); Jonathan A. Gonen, Calabasas, CA (US); Danny Rosen, Valley Village, CA (US)

(73) Assignee: Metro Enterprises, Inc., Beverly Hills, CA (US)

( * ) Notice: Subject to any disclaimer, the term of this patent is extended or adjusted under 35 U.S.C. 154(b) by 481 days.

This patent is subject to a terminal disclaimer.

(21) Appl. No.: 11/457,426

(22) Filed: Jul. 13, 2006

(65) Prior Publication Data

US 2006/0247999 A1   Nov. 2, 2006

Related U.S. Application Data

(63) Continuation-in-part of application No. 11/162,592, filed on Sep. 15, 2005, now Pat. No. 7,953,416, which is a continuation-in-part of application No. 11/020,375, filed on Dec. 22, 2004, now Pat. No. 7,076,037.

(51) Int. Cl.
*H04W 40/00* (2009.01)

(52) U.S. Cl. ............... 455/445; 455/227.1; 455/406; 455/411; 455/412.2; 455/413; 379/114.01; 379/114.02; 379/114.13; 379/114.1; 379/221.02; 705/14.58; 705/14.63; 705/37

(58) Field of Classification Search ............... 455/445, 455/277.1, 406, 411, 412.2, 413; 379/114.01, 379/114.02, 114.13, 114.1, 221.02, 221.01, 379/221.03, 114.11, 265.02, 221.06; 705/14.58, 14.63, 37

See application file for complete search history.

(56) References Cited

U.S. PATENT DOCUMENTS

| | | | |
|---|---|---|---|
| 6,373,929 B1 * | 4/2002 | Johnson et al. | 379/114.02 |
| 6,636,590 B1 * | 10/2003 | Jacob et al. | 379/114.05 |
| 6,704,403 B2 * | 3/2004 | Lurie et al. | 379/114.1 |
| 6,801,899 B2 | 10/2004 | Lauffer | |
| 6,865,540 B1 | 3/2005 | Faber et al. | |
| 2001/0047354 A1 * | 11/2001 | Davis et al. | 707/3 |
| 2003/0190029 A1 * | 10/2003 | Marcus | 379/219 |
| 2004/0249709 A1 * | 12/2004 | Donovan et al. | 705/14 |
| 2005/0160171 A1 * | 7/2005 | Rabie et al. | 709/227 |
| 2006/0147006 A1 * | 7/2006 | Gonen et al. | 379/114.11 |
| 2006/0190354 A1 * | 8/2006 | Meisel et al. | 705/26 |
| 2007/0060136 A1 * | 3/2007 | Ramer et al. | 455/445 |
| 2007/0269038 A1 * | 11/2007 | Gonen et al. | 379/265.02 |

OTHER PUBLICATIONS

Selected web pages of www.free411.com.
Selected web pages of www.ingenio.com.

* cited by examiner

*Primary Examiner* — Danh Le
*Assistant Examiner* — Khai M Nguyen
(74) *Attorney, Agent, or Firm* — Kelley & Kelley, LLP (57) ABSTRACT

A process for dynamic routing of customer contacts to service providers includes establishing accounts in a service provider contact system for a plurality of service providers. The plurality of service providers are permitted to bid against one another for providing goods and/or services to a customer. A contact list is created of service providers ranked from a lowest bidder service provider to a highest bidder service provider. A contact is received from a customer and routed from the customer to the lowest bidder service provider on the contact list. The service provider account receiving the contact and fulfilling the transaction is credited the amount bid by the service provider.

50 Claims, 7 Drawing Sheets

PROCESS FOR DYNAMIC ROUTING OF CUSTOMER CONTACTS TO SERVICE PROVIDERS IN REAL TIME

BACKGROUND OF THE INVENTION

The present invention generally relates to routing customer contacts, such as telephone call routing. More particularly, the present invention relates to a process for dynamically routing customer contacts to service providers who have bid for the opportunity to receive such contacts.

Consumers interested in acquiring services must first find a service provider who is capable of providing the required services. Typically, this means perusing a telephone directory and selecting a service provider from the often long list of service providers. In some areas of the country, this requires that the consumer determine which service providers are sufficiently close to the consumer geographically so as to attend to their needs in a reasonable time frame and for a reasonable cost. This process can become frustrating and time consuming, particularly if the consumer must leave messages for service providers who are not currently available to take their calls. In such an instance, the consumer is faced with the choice of leaving a message and hoping that the service provider will contact them shortly, or leaving multiple messages with multiple service providers until reaching a service provider who is available, and then dealing with the return calls of service providers whose services are no longer necessary.

Many consumers now own computers and have access to the Internet. Searches can be conducted to find service providers on the Internet. Some of these service providers have web-sites which provide information that can be valuable to the consumer. Traditionally, service providers and other businesses on the Internet have paid for each "hit" or each time an on-line user clicks or otherwise selects their link to arrive at their web-site. This requires two steps, identifying a service provider on a web-site and then generating a phone call or e-mail request. Moreover, such hits have been found not to be overly promising as the on-line user may surf the web by selecting and viewing several web-sites before calling a business or service provider. Accordingly, such "hits" often typically only cost the web-site owner a few cents as acquiring business from a given hit is unlikely.

There are many disadvantages, however, that present themselves to the consumers that conduct on-line shopping for service providers. First, appropriate Internet searches must be conducted in order to arrive at the service providers in question. Next, the on-line customer must determine which service providers are in their geographic location or which suits their service needs, and select among a plurality of the service providers. This, of course, assumes that the customer owns a computer and has the necessary Internet connection. Moreover, it is estimated that approximately seventy percent (70%) of small and medium businesses do not have active web-sites. Thus, there are millions of service providers such as restaurants, plumbers, and other small businesses that do not conduct transactions on-line or have any web presence whatsoever.

Ingenio, Inc. has developed an on-line based pay-per call system for routing telephone calls made by consumers to advertisers, as disclosed in U.S. Pat. No. 6,704,403. The advertiser, such as a service provider, registers so as to have its name and telephone number (typically a unique toll free number for that particular service provider/advertiser) presented on the Internet. When an on-line consumer searches for a particular service, a list of service providers/advertisers is presented to the consumer. A consumer can select from this list and dial the service provider's telephone number. If the service provider is not available, a message is left with the service provider. A predetermined flat fee is charged for each call made to the service provider. The '403 patent describes this fee as being paid by the potential customer, such that the service provider is compensated for the time in taking the customer's call. The '403 patent further discloses that a per minute fee is also charged to either the service provider or the potential customer after an initial time period, such as 10-minutes. The theory behind this fee is that if a potential customer is on the phone with a service provider for a significant amount of time, the likelihood that the service provider will actually sell goods or perform services for the customer increases. Thus, the service provider does not need to pay for dead-end "hits" or maintain a web-site or other Internet presence.

However, the Ingenio system also has several drawbacks. First, the consumer must have a computer and Internet access. Next, the consumer must conduct an on-line search to find the list of service providers for the service that the consumer is in need of. This may not take into account the consumer's geographic location. The consumer then selects a single service provider, and if that service provider is not available the consumer must leave a message. Although the '403 patent discloses technology which facilities the service provider returning the consumer's telephone call, the consumer is still left with the unenviable option of waiting for the service provider to return his or her call, or calling other service providers on the list. While benefiting various service providers who otherwise do not have an Internet presence, the Ingenio system does little to benefit the consumer. Moreover, the '403 patent does not take into account other contact or customer originated contact means, such as satellite-enabled voice-links, VOIP contacts, or electronic messages.

Accordingly, there is a continuing need for a dynamic contact routing system which charges a service provider only for contacts received, but which meets the needs of the customer as well, thus overcoming the drawbacks described above. The present invention fulfills these needs and provides other related advantages.

SUMMARY OF THE INVENTION

The present invention resides in a process for dynamically routing customer originated contacts to service providers. The process of the present invention presents the potential customer with a live conversation or immediate feedback, instead of the customer leaving a message and waiting for a service provider to return the telephone call or contact.

The process of the present invention generally comprises the dynamic routing of customer contacts to service providers that have established accounts in a service provider contact system. A maximum acceptable bid from the service providers is established. A plurality of service providers are permitted to bid against one another for providing goods and/or services to a customer. A contact list is created comprised of the service providers ranked from a lowest bidder service provider to a highest bidder service provider. In a particularly preferred embodiment, the bidding between service providers is ongoing such that the service providers are allowed to enter new bids for the per-contact charge. A service provider is notified when its bidding ranking on the contact list has changed. The service provider is permitted to enter a new bid. Although contact lists are typically created according to service provider type and geographic locations, the invention contemplates permitting the service providers to select one or more contact lists, such as when they provide a plurality of services or extend into a plurality of geographic locations.

A contact from a customer is received from the customer and routed to the lowest bidder service provider on the contact list. A service provider, to whom the customer contact is routed, is permitted to accept or reject the contact, by speech recognition or keypad entry. If the lowest bidder service provider does not accept the contact, the customer contact is rerouted to the next lowest bidder service provider on the contact list. The invention also contemplates permitting service providers to set time periods of contact acceptance and rejection. The customer contact is rerouted to a next lowest bidder service provider on the contact list if the lowest bidder service provider does not respond to the customer contact. The service provider account receiving the contact is credited the amount bid by the service provider.

The customer originated contact may comprise a live conversation via a real-time communications link, such as a telephonic link, a voice over Internet protocol (VOIP) link, a satellite enabled voice link or an audio visual link. Alternatively, the contact may comprise a customer originated electronic message. The electronic message may comprise a text message, a SMS message, an e-mail message, or the like. The selection of goods and/or services by the customer generates the contact.

In the case when the customer originated contact is a telephone call, preferably, the telephone number is a toll-free telephone number suggestive of a group of service providers. A promoter may be used to advertise the service provider contact system, the telephone number, or other contact information, to customers and obtain service provider accounts. In such a case, the system host, or owner of the process, and the promoter of the process share the amount charged to the customer.

Typically, when a customer originates a contact or query, the geographic location of the customer is determined so as to select a contact list based on that geographic location. This may be done automatically by deriving the geographic location from the customer's telephone contact identification. Geographic location of the customer can also be determined or derived by means of GPS-assisted location, triangulation, operator-assisted location, or cell-phone company assisted location. Alternatively, the customer is prompted to provide the geographic location information to route the service provider to a contact list with the corresponding geographic location. This may be accomplished, for example, by speech recognition or telephone key-pad entry. In some instances, the customer may be prompted to make a selection before being routed to a service provider, or after being routed to a service provider in order to facilitate the appropriate routing of the customer contact. This can be performed by speech recognition or telephone keypad entry.

In the end, the customer is billed, typically by the host or promoter, for the goods and/or services provided by the service provider. The account status is available to the service provider through e-mail, account log-in, telephone, customer support or mail. A service provider may be removed from the contact list of service providers. Crediting of the service provider's account includes paying the service provider in real time or on a periodic basis.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a dynamic contact routing process for linking customers who are in need of goods or services with such a service provider. As will be more fully described herein, the present invention provides benefits both to the potential customers, as well as to the service providers. It should be understood that the term "customers" herein refers to any type of customer seeking any goods or services or information. "Service provider" refers to any entity or individual providing such services, goods, or information who belong to the system by setting up an account, as will be more fully described herein.

Figure 1:
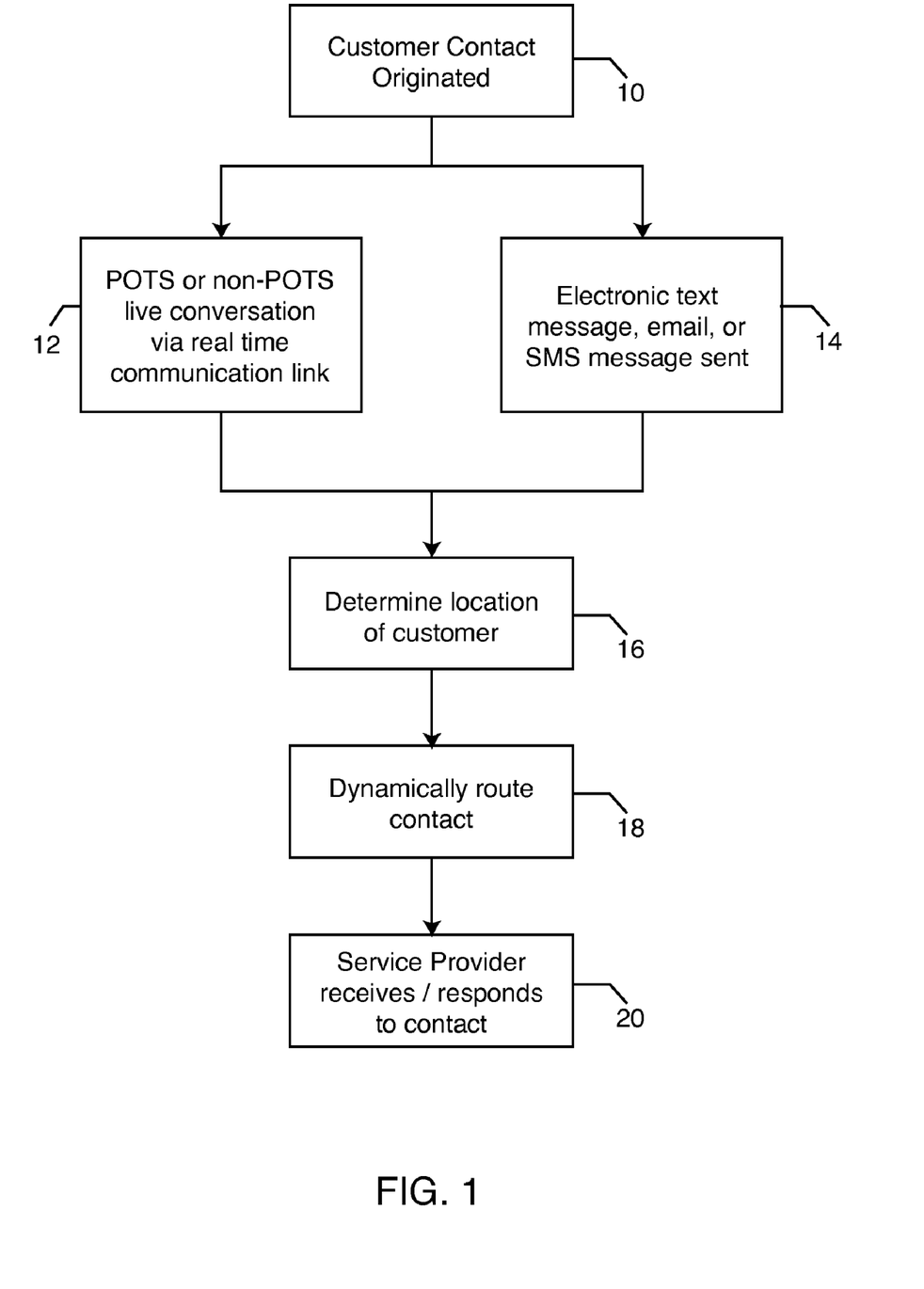
FIG. 1 is a flow chart depicting the steps taken generally, in accordance with the present invention, in routing a customer originated contact to a service provider.

With reference now to FIG. 1, the invention is generally illustrated. First, a customer contact is originated (10). This can take many forms. In a particularly preferred embodiment, the contact is a plain old telephone service (POTS) telephone call through a public switched telephone network (PSTN), although this can be a non-POTS live conversation, via a real-time communication link such as a satellite-enabled voice link, voice activated dialing link, VOIP, or the like (12). An example of a satellite enabled contact or voice-link is the service provided by OnStar™, wherein drivers or passengers in a vehicle can press a button and be placed in contact with an OnStar™ operator. The user could indicate the goods or services he or she desires, and the system of the present invention would route the contact, as described more fully herein. Of course, it will be appreciated that the customer originator contact could also comprise an electronic message, such as a text message, e-mail or SMS message (14). Such an electronic message could be originated from the user's computer, cell phone, personal digital assistant, vehicle navigation assistance device, etc.

The location of the customer is then determined (16). This can be done in a number of ways. The geographic location can be automatically determined by means of customer telephone identification, GPS-assisted location, triangulation, operator-assisted location, or cell-phone assisted location. Alternatively, the customer is prompted to provide the geographic location information, which can be done in an automated fashion by means of speech recognition or key-pad entry.

The customer contact is then dynamically routed (18) to a service provider who receives or responds to the customer contact or request (20). The contact is dynamically routed according to the goods or services the customer desires, the geographic location of the customer, and a hierarchical contact list of service provides, as will be more fully described herein.

Figure 2:
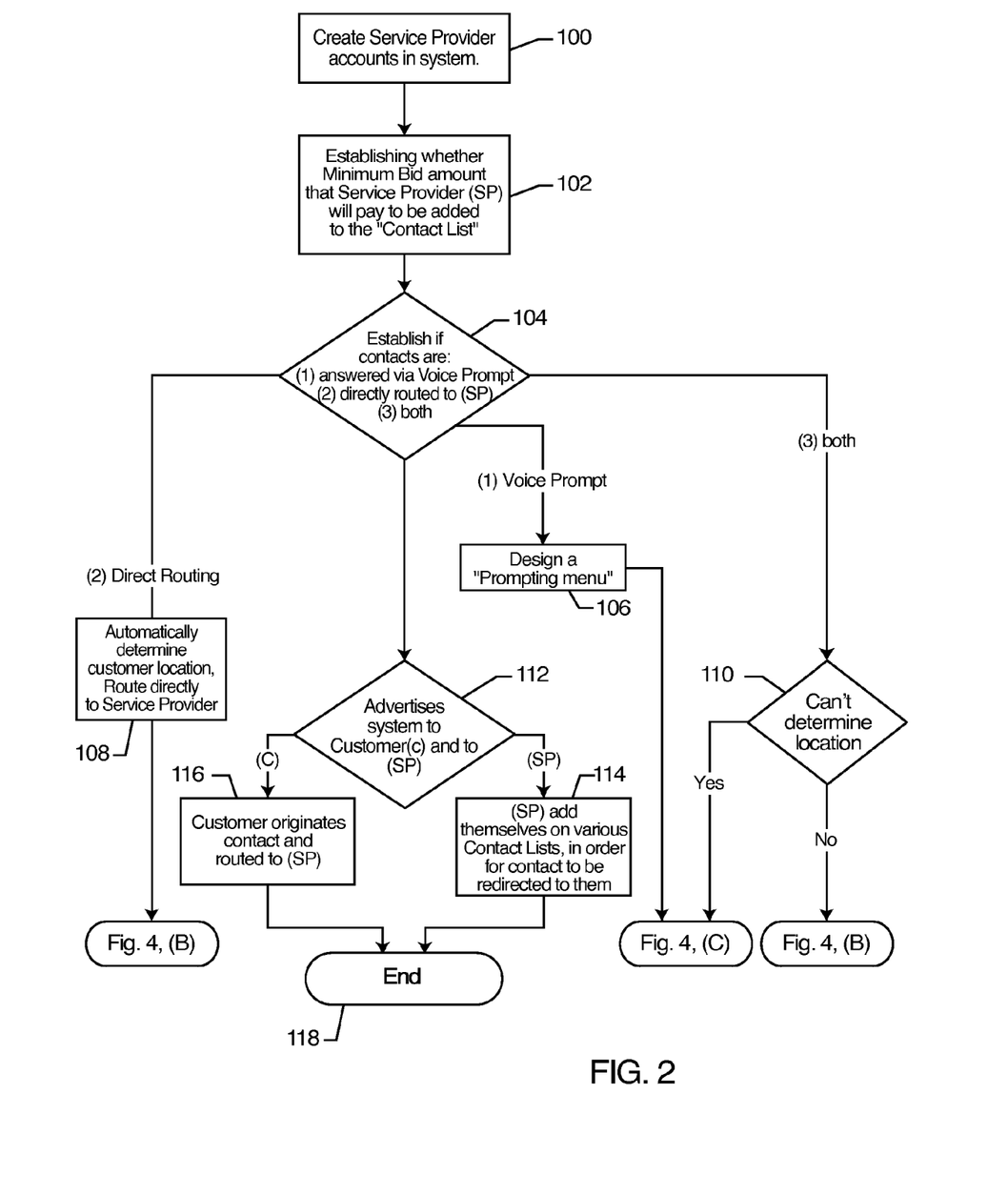
FIG. 2 is a flow chart depicting the steps taken in setting up a system embodying the present invention.

With reference now to FIG. 2, the contact routing system and process of the present invention is first established. Although the owner to the rights to the invention could serve as a host nationwide, or even in a given geographic area, more typically, promoters (P) are used to create accounts in the system (100). That is, the promoter may negotiate in order to have a certain geographic territory or a certain type of service provider (SP). The promoter would create an account with the host or owner of the system of the present invention, such as by using the Internet, by telephone or even by mail. The process of the present invention gives the promoter the ability to create a system that can route customer contacts to various service providers based on how the promoter designs the contact routing business.

Once the promoter's account is created, the promoter may deposit money into the account. This may be done by sending in a check or money order, or providing a credit card such that a credit is established with the host. Money may also be electronically debited by the host from the promoter's bank account. Alternatively, no money needs to be deposited into the promoter account, but rather the promoter can pay the host on a periodic basis, such as monthly, for the contacts which have been received and the revenue share generated by the service provider accounts. The promoter's payment to the host can be made after receiving a periodic bill from the host (e.g., a monthly billing statement). The promoter can arrange for the host to automatically electronically debit a bank account belonging to the promoter on a periodic basis.

The promoter may establish a minimum bid amount or listing fee that a service provider will have to pay to be included in the system on a contact list (102).

The promoter then establishes whether the received contacts are to be answered by a voice prompt, directly routed to a service provider, or a combination thereof (104). In the case of telephone call contacts, preferably, either the promoter or the host owns a telephone number which is suggestive of a group of service providers. Even more preferably, the telephone number is a toll-free telephone number, such as a 1-800 or 1-866 telephone number. For example, the telephone number may be 1-800-PLUMBER, 1-800-FLOWERS, 1-800-LAWYERS, etc. Typically, the promoter will advertise the telephone number or other contact information and system service, such as in its geographic area, so that both potential service providers and customers will become aware it. Such advertising can take place on the Internet, telephone directories, on bill boards, mass mailers, etc. Thus, service providers do not need to have the sophistication or pay the fees necessary to have an Internet presence, and potential customers do not need to own a computer and have Internet access in order to become aware of the contact information for the group of service providers belonging to the system. A suggestive toll-free number would be most desirable as the potential consumers would readily remember such telephone numbers and not need to reference any additional materials when that service is needed, but instead contact the number from memory. However, the telephone numbers need not be toll-free nor suggestive. It will also be appreciated that the contact information can comprise information other than telephone numbers, such as a web-site address, an e-mail address, or by any other means. For example, satellite-enabled communication is increasingly available to customers. One of the more well-known types of this communications is the OnStar™ service, wherein vehicle drivers or passengers can press a button and be placed in contact with an OnStar™ operator, who currently provides accident or repair assistance, driving directions and the like. Implementing the present invention, the vehicle driver or passenger could request a restaurant in a given geographic location, a hotel, a mechanic, etc.

Referring again to FIG. 1, if the promoter establishes that the contacts are to be answered via voice prompt, the promoter designs a unique prompting menu to suit the specific business requirements (106). For example, if a potential customer were to call 1-800 LAWYERS, a prompting menu may prompt the potential customer to select an area of law, such as intellectual property, real estate, family law, or criminal law. The system could be designed so as to either receive such selection by speech recognition, or by prompting the potential customer to press a certain number or button on the telephone key-pad. The prompting menu is typically provided to the customer immediately upon calling the telephone number before the contact is routed to a service provider, but can be provided after a contact is routed in order that certain information may be obtained by the particular service provider before taking the telephone contact.

Alternatively, or additionally, when a potential customer originates a contact, the system is designed such that the caller is identified by the contact identification, which includes the customer's telephone number (108). In this manner, the system can detect the geographic location of the customer contacting and determine an appropriate service provider contact list, such as one based on geographic location.

The system may also be designed with both, such that when the caller identification is blocked (110) other measures can be taken to determine location such as initiating a voice-prompt, connecting the contact with a customer service representative, etc., which will be more fully described herein.

Once the promoter and/or host has established the menu driven software, the promoter advertises the contact routing system service. As discussed above, the promoter advertises the telephone number to potential customers and service providers (112). In such a manner, a service provider desiring to belong to the system can call to add themselves on various contact lists in order for customer contact to be directed to them (114). Of course, the service providers can also contact the promoter or host in different ways, such as by visiting a web-site, calling the promoter mailing or faxing a registration form to the promoter or host, etc. As will be more fully discussed herein, the customer also contacts a unique telephone number or other contact means in order to be directed to a service provider (116), as will be more fully described in FIG. 4.

Figure 3:
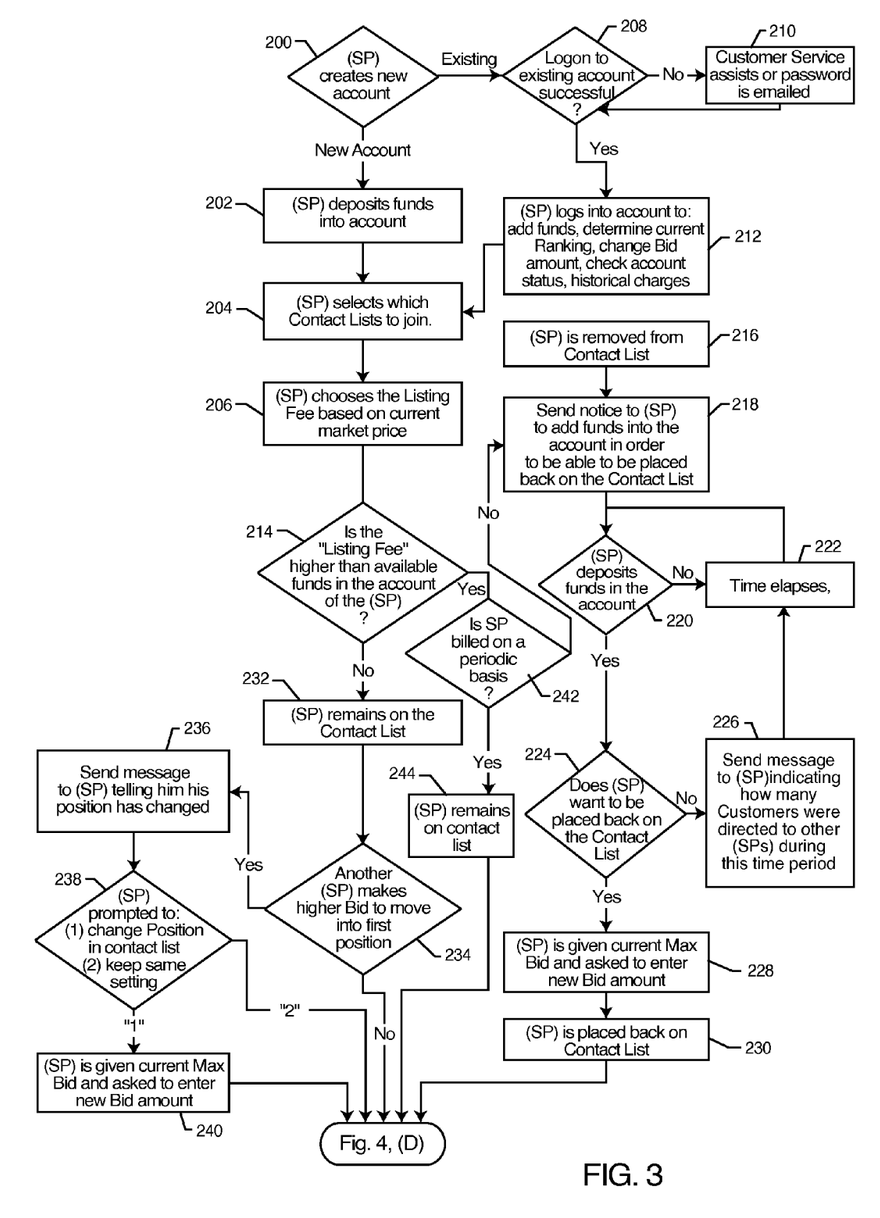
FIG. 3 is a flow chart depicting the steps for creating service provider accounts and service provider per-contact charge bidding, in accordance with the present invention.

With reference now to FIG. 3, when promoting the system of the present invention, the potential service providers are informed that they are only obligated to pay the promoter and/or host when a potential customer contact is actually received. This removes many of the uncertainties associated with listing one's telephone number in a telephone directory or paying an Internet advertiser for "hits". The service provider first creates a new account with a promoter and/or host (200). The account, at a minimum, will identify the service provider and include contact information such as a telephone number, e-mail address, etc., for which contacts can be directly provided to the service provider. The service provider then deposits funds into the account (202) such as by credit card, check, etc. in the same and/or similar manner in which the promoter deposits money into their account. Money may also be electronically debited by the promoter and/or host from the service provider's bank account.

After establishing an account, the service provider selects which contact list to join (204). The system may be designed such so that the geographic location of the service provider automatically associates it with a particular contact list. In other instances, there may be no geographic territory limitation whatsoever and thus the service provider is available on a nation-wide or state-wide contact list. The service provider may have multiple offices such that the service provider can select multiple contact lists representing the multiple geographic locations in which its offices are located. Furthermore, the service provider may in fact offer more than one type of service. For example, if the service provider is a law firm, the law firm may provide representation in criminal law, real estate, litigation, etc., and thus be eligible for multiple contact lists even within a single geographical location. The service provider may also be able to bid different amounts for different geographical locations. That is, belonging to a particular contact list may be more valuable then belonging to other contact lists, such as when the geographic location is a metropolitan area, when the contact list is more specifically defined, such as a particular city versus a valley or county, etc.

The service provider then chooses the listing fee, or per-contact charge fee based upon an established minimum and/or a current market price (206). Typically, a minimum per-contact received charge is established by the promoter and/or host. This would be a minimum per-contact charge for a customer contact received by a service provider. For example, this may be established as being one dollar per contact.

However, in a particularly preferred embodiment of the invention, the service providers are able to bid against one another for a "high" bid per contact amount. The service provider can then view not only the minimum established per-contact listing fee, but also the maximum or highest bid on the contact list. The service provider can also call a telephone number, such as a customer service number or the like to retrieve this information as well. As will be more fully described herein, the contact lists are ranked from highest bidder to lowest bidder and the customer contact is routed accordingly. Thus, although the minimum listing fee or per-contact charge may only be one dollar, the market price that the service providers are willing to pay in order to be ranked highest and potentially receive the most customer contacts may be much higher, such as two dollars or even more per contact. The service provider is able to, at this point, select the per-contact charge and bid against the others in the contact list. The service provider can choose to pay the high bid amount to move to first position or pay a lower bid amount which will place them in lower priority on the list. The least amount of money that a service provider can select is the established minimum bid amount. As customer contacts are routed to the service provider, the per-contact charge, which is either the minimum bid amount or the amount bid by the service provider is deducted from the service provider's account.

The invention contemplates that certain service providers may hold regular business hours such as 8:00 a.m. to 5:00 p.m., and thus customer contacts will not be routed to that service provider before 8:00 a.m. or after 5:00 p.m. The system can be designed such that the service provider can place a bid for a certain time of day, such that, for example, contact received between 8:00 a.m. and Noon, receive the highest bids, while those contact received in the afternoon receive lower bids, and the service provider is able to put a zero bid for non-business hours. Additionally, or alternatively, the service provider can indicate which days of the week and what hours of the day the service provider is available to receive contacts, such that customer contacts are not routed to a service provider who is not available.

Each service provider is permitted access to its account by logging on through the Internet, by telephone, etc. Preferably, the accounts are available through the Internet, such that the information is completely available to the service provider on the provider's or host's web-site. If the log in is not successful, a customer service representative can assist the service provider, or the password can be electronically mailed to the service provider (210).

Once the service provider successfully logs into the account, it can add funds to the account, determine its current ranking, increase its bid amount per-contact, check on account balance, check on historical charges and contact, and otherwise check on the account status (212). Thus, the amount per-contact charge bids are preferably constantly able to be altered, and not just upon registration of the account. In this manner, service providers can change their rank in the contact list and the free market will determine the upper price per-contact received, maximizing the promoter or host revenue and granting some degree of control to the service providers on the number of contacts received.

If the "listing fee" or bid amount of the service provider is higher than the available funds in the account of the service provider (214), the service provider is removed from the contact list (216). A notice is sent to the service provider informing it of the lack of funds, with an invitation to add additional funds in the account in order to be placed back on the contact list (218). Such notice may be automated, such as by sending an electronic mail message, instant message, telephone message, postcard, or the like. The service provider is then permitted the opportunity to add additional funds into their account (220), such as by authorizing a credit card transaction, sending in a check or other payment to the promoter or host. If the service provider does not deposit funds into the account after a predetermined time, such as two days, an additional notice may be sent to the service provider to add funds into the account in order to be placed back on the contact list (218). If the service provider does not want to be placed back on the contact list, a message is sent to the service provider, preferably periodically, indicating how many customers were directed to other service providers during this time in order to persuade the service provider to register with the system again (226). If the service provider does want to be placed back on the contact list, the service provider is given the maximum or highest bid and asked to enter a new bid amount or select the established minimum bid amount (228). The service provider is then placed back on the list (230). Once on the contact list, the service provider is routed customer contacts in accordance with the present invention.

If the service provider's bid is lower than the available funds in its account, the service provider remains on the contact list (232). Alternatively, the service provider may have an open account wherein the service provider is billed on a periodic basis, such as a monthly cycle (242), and thus the service provider remains on the contact list (244) even if there are insufficient funds in the account to accommodate the service provider's bid per contact. The service provider's payment to the promoter and/or host can be made after receiving the periodic bill. The service provider can arrange for the promoter and/or host to automatically electronically debit a bank account belonging to the service provider on a periodic basis. As mentioned above, the service provider is permitted access to its account and can periodically add funds as necessary and determine its current ranking and increase its bid amount. If a new service provider or an existing service provider on the contact list makes a higher bid so as to move into a position above the service provider, or the highest ranking position on the contact list (234), a message is sent to the service provider informing it of its change in position (236). As will be appreciated by those skilled in the art, the message may be sent automatically by electronic mail, instant messaging, telephone voice mail messaging, etc. The service provider is prompted to log onto its account in order to increase its bid amount in order to change its position on the contact list or do nothing and keep the lower position (238). As part of the message to the service provider, the service provider may be given the current maximum bid amount and asked to enter a new bid amount (240). For example, when registering, the service provider may provide a credit card or account number which can be automatically debited by the promoter or host per instructions of the service provider. A speech recognition or window-driven portion of the message to the service provider may provide a menu in which the service provider can opt to deposit additional funds into the account, such as to cover an inadequate balance, or to increase its bid amount per-contact received. In this manner, the service provider is not required to log into its account in order to accomplish these two tasks. The automated system can then inform the service provider of the balance of the account, and the new minimum bid by the service provider. Such steps can be conducted with an interactive speech recognition driven menu, if a telephone message is directed to the service provider or if the service provider contacts a promoter's or host's customer service number, or can be accomplished through electronic mail, instant messaging, or by logging onto the service provider's account. Of course, it will be appreciated that the promoter or host may employ operators or customer service representatives who can receive a response to account requests by service providers, as well as assisting customers.

Figure 4:
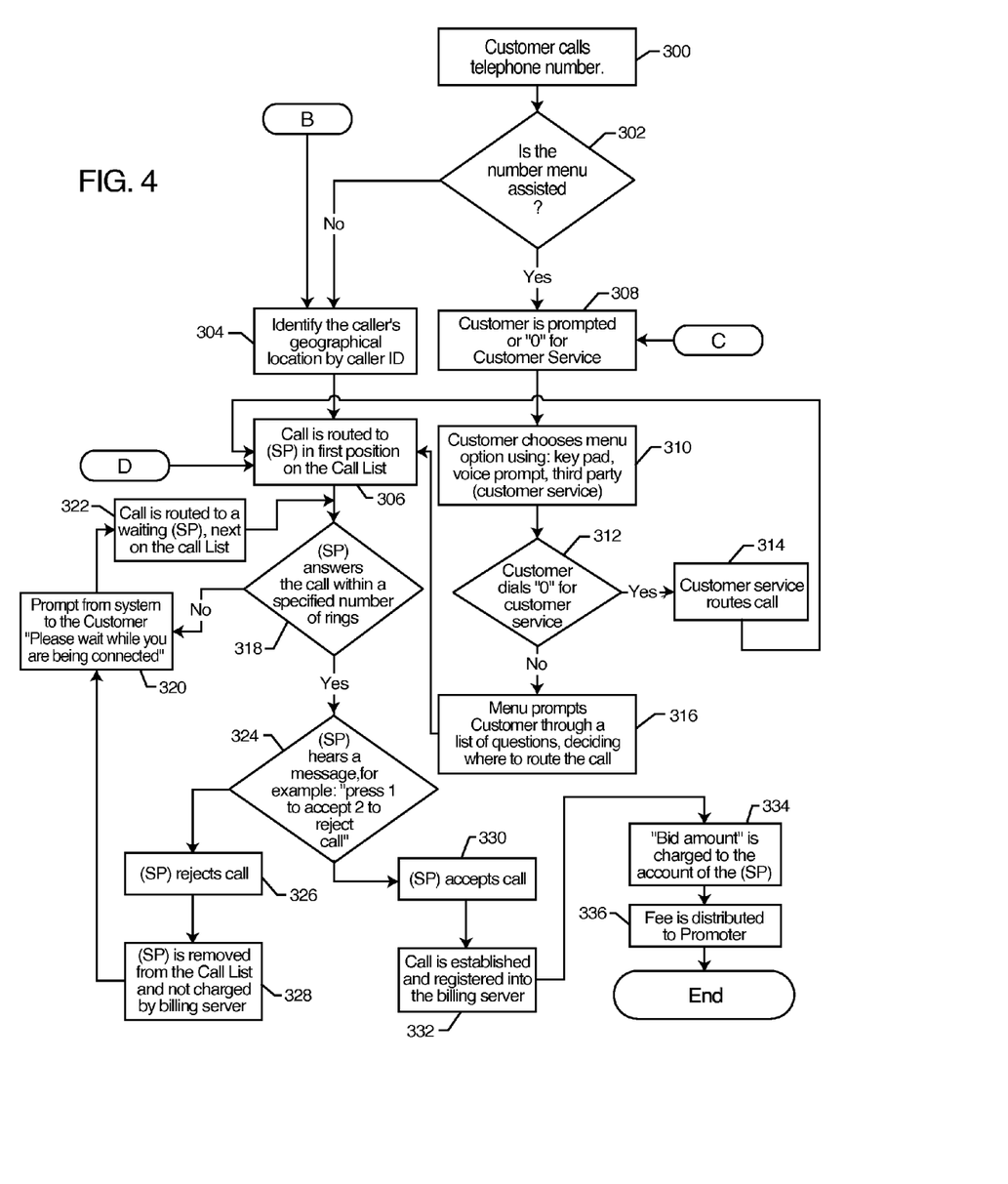
FIG. 4 is a flow chart depicting the steps taken when a customer originates a contact or request for a service provider in accordance with the present invention.

With reference now to FIG. 4, the process for routing a customer originated contact in the form of a telephone call is illustrated. A potential customer calls the telephone number, which is preferably a toll-free number as described above, but also may be local or long distance number, or even a special number such as a 1-900 number, or any other appropriate telephone number (300). The system then determines if the number is menu assisted, or needs menu assistance (302). As outlined above, VOIP is another route for customers calling into the network. Customers can also be connected to the service providers by VOIP, as well. While calls can be routed through the PSTN, routing need not be done through the PSTN at all or only one part of the call is routed through the PSTN (e.g., customer calls using PSTN, but routed through to the service provider using VOIP). If the system is set up so as to identify the caller's geographical location by caller identification (304) then the call is automatically routed to the service provider in the first, or highest ranked bidder, position in the call list (306). In those instances where there is no geographic limitation, the call can be automatically routed without identifying the caller's telephone identification by simply routing the call to the service provider in first position on the call list.

If the number is menu assisted, such that the caller identification is blocked, or the system has been designed so as to be menu driven, the customer is prompted or asked to select customer service, such by depressing the "zero" button on the telephone keypad or by speaking into the telephone. The prompting, as discussed above, may be directed to the geographic location of the customer, or the geographic location of the service to be provided. In such instance, the customer can, by speech recognition or keypad entry, enter the area code, zip code, city, state, etc. In the event that the prompt is not directed to geographic location, but to some other selection, such as type of service, the customer is asked to make that selection either by speaking into the telephone or by depressing a key on the telephone keypad (308). For example, the customer may be asked what kind of car they want to rent. The customer can select between luxury, compact, mini-van, etc. This may occur before the call or after the call is routed and before the service provider answers the telephone as discussed above (310).

If the customer has difficulty with the menu selection, the customer can dial "zero" for customer service (312) or otherwise request customer service such as by speaking into the telephone wherein a customer service representative will route the call (314) to the service provider in first position on the call list (306). However, if a customer does not select customer service, but is instead prompted to a list of questions on the menu, the system decides where to route the call (316), which is the service provider in first position on the appropriate call list (306).

The present invention also contemplates a "search engine" which is an automated telephone system similar to dialing a 411 operator. In this embodiment, there are many different industries or service providers which have bids in a higher rank to receive calls for their industry and/or selected geographical locations. The customer will call a telephone number needing a phone query. The customer can then be routed as described herein, or by selecting a particular industry or need by speaking into the phone or entering information into the phone by the key pad or the like.

Once the call is routed to the service provider in the highest ranking first position on the call list, the service provider must answer the call within a specified number of rings, such as three or four rings. If they do not, the system may prompt the customer to "please wait, while you are being connected" (320), while the call is routed to the next waiting service provider on the call list (322). In this manner, if a service provider is on another telephone call or is on vacation or the like, the customer is routed to a service provider immediately without having to leave a message. This enables service providers that are not the highest ranked service provider on the call list to receive calls as well. However, it will be appreciated that the highest ranking service provider will receive the larger number of customer calls.

However, if the service provider answers the call within a specified number of rings (318), that service provider is either presented with a live customer call, or the system may be devised such that the service provider is offered a message from the automated system, for example, "press 1 to accept", "2 to reject calls", or the service provider is asked to voice their acceptance or rejection which will be interpreted by speech recognition software or the like (324). If the service provider rejects the call, the service provider is typically removed from the calling list and not charged by the billing server (328). Alternatively, the system may be devised such that the service provider is not removed from the call list, but instead can selectively accept or reject calls until the account balance falls below the service provider's minimum bid, or the service provider closes its account. In any event, the system will route the call to the next highest ranking service provider on the call list (322).

If the highest ranking service provider accepts the call, either by expressly stating or pressing a button to accept the call or merely answering the telephone call (330), the call is established and registered into the billing server (332). The service provider's "bid amount" that the service provider previously bid per-call is charged to the account of the service provider (334). Preferably, the per-call charge bid amount is automatically deducted from the account of the service provider but service providers using post-paid accounts can be billed on a periodic basis. The fee is then distributed to the promoter (336).

Although the above-provided description relating to FIG. 4 has been directed to a customer originated contact in the form of a telephone call, such as a cell phone or plain old telephone service "land line" call, the present invention is not necessarily limited to such. As described above, other forms of routing besides telephonic calls are contemplated. Live voice conversations can be conducted through Internet or VOIP links, a satellite-enabled up-link (such as OnStar™), automated dialers, which include preprogrammed telephone or contact numbers, part of another system that does not require the potential customer to dial an actual telephone number. Dynamic routing of non-voice customer contacts, such as electronic messages, including text messages, SMS messages, e-mail messages, and the like, are also contemplated by the present invention. For example, an e-mail originated customer contact or request may be routed to the pertinent service provider's e-mail address, telephonic device, SMS device, or the like. Similarly, an SMS or text message originated customer request can be routed to the service provider's SMS device, telephonic device, or the like. The service provider can respond by electronic message, or otherwise contacting the potential customer, such as by telephone. Similar steps illustrated in FIG. 4, could apply to each of these types of communication contacts originated by the customer and routed to a service provider who receives a response to the customer request.

Figure 5:
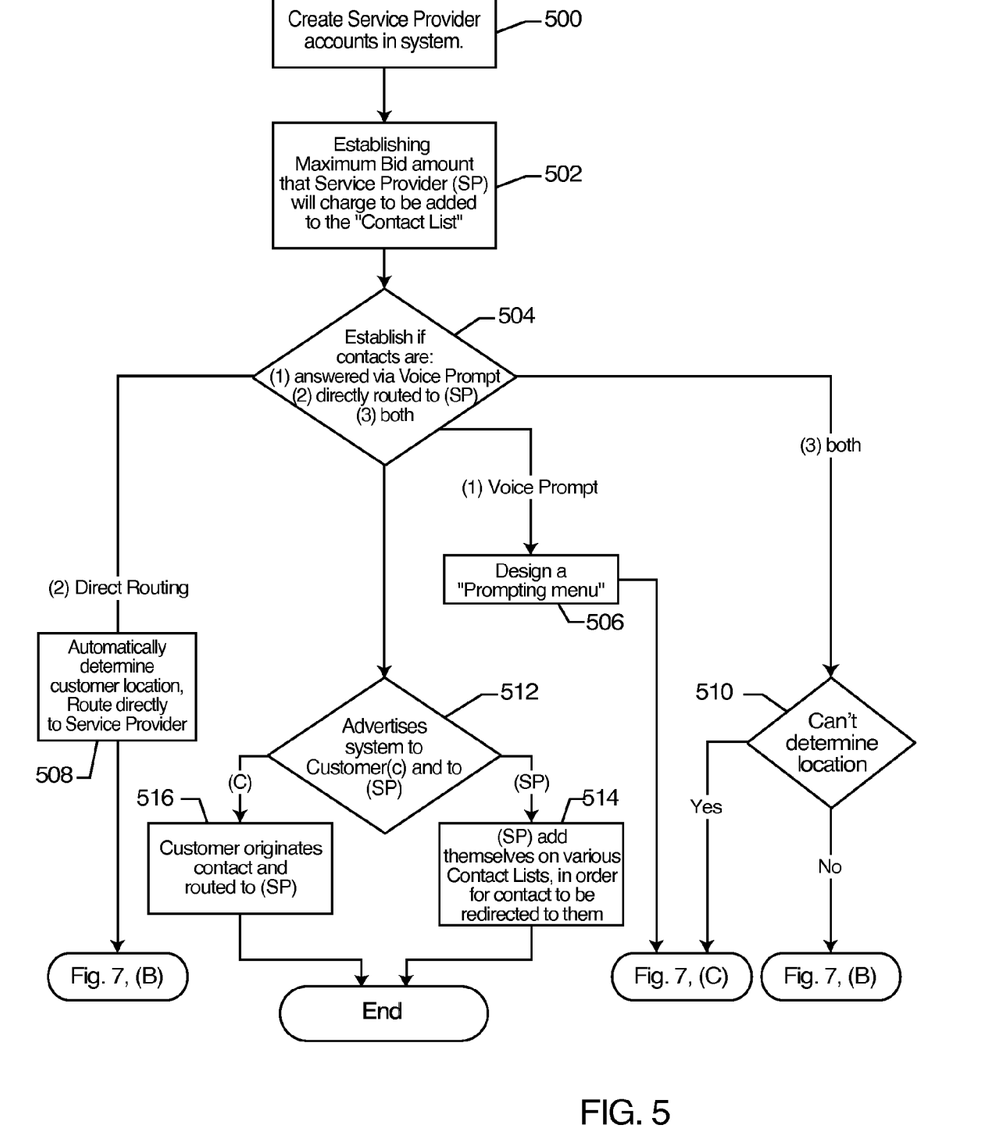
FIG. 5 is a flow chart depicting the steps taken in setting up another system embodying the present invention.
Figure 6:
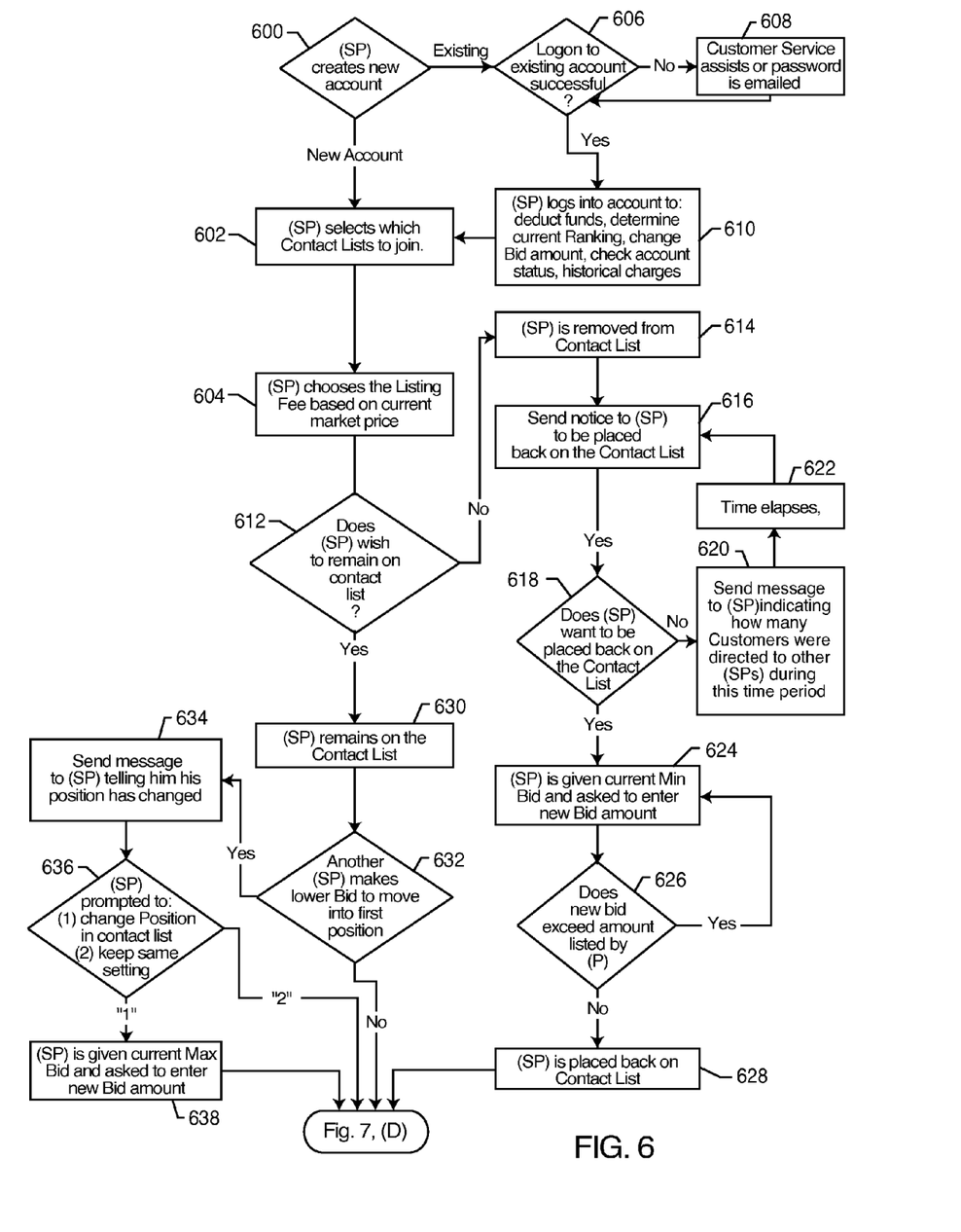
FIG. 6 is a flow chart depicting the steps for creating service provider accounts and service provider bidding, in accordance with the present invention.
Figure 7:
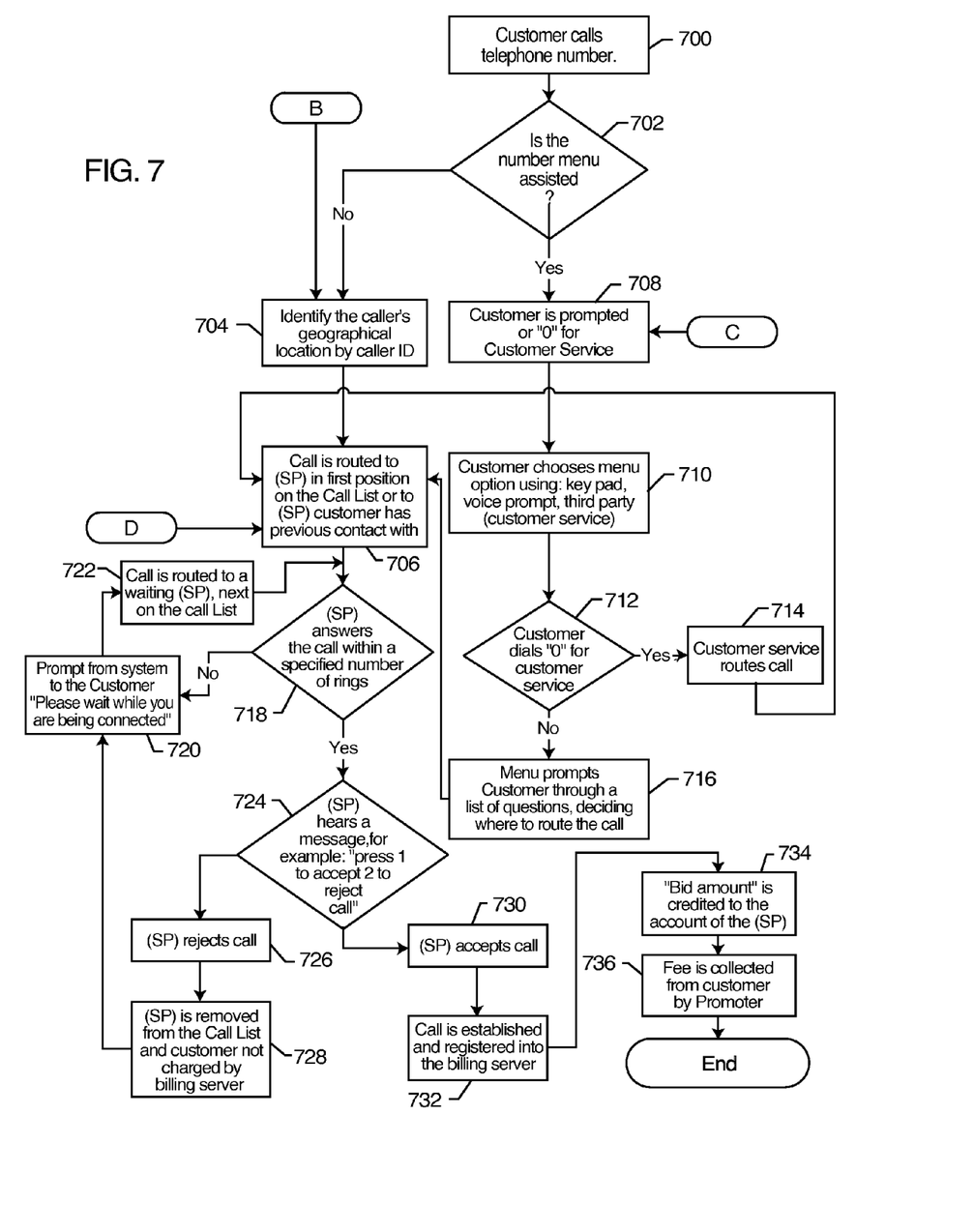
FIG. 7 is a flow chart depicting the steps taken when a customer originates a contact or request for a service provider in accordance with the present invention.

In accordance with another embodiment of the invention, with reference to FIGS. 5-7, in general, service providers from all over the world will be able to bid a minimum that they are willing to accept as payment from the promoter and/or host to provide advice, goods, and/or services to customers. For example, a promoter and/or host operates telephone lines (e.g., 1-800-ADVICE, 1-800-ROSES, 1-800-LAWYERS, etc.) or websites (www.advice.com, www.roses.com, www.lawyers.com, etc.) that provides goods and/or services. A customer can call 1-800-ADVICE, 1-800-ROSES, 1-800-LAWYERS, etc. or access the promoter's and/or host's website in order to obtain desired goods and/or services. The customer is then routed to the service provider who has bid the lowest amount to provide that good or service to the customer on behalf of the promoter and/or host. In this manner, the service provider acts as an independent sub-contractor on behalf of the promoter and a customer is routed to the service provider who is willing to perform the service desired by the customer on behalf of the promoter and/or host for the least amount of money.

A customer can be charged a flat fee for the call (e.g., $2 per call or $20 for a bouquet of roses) or be charged a variable fee based on the service provider's bid (e.g., $2.00 per minute for a call). The customer is charged directly by the promoter and/or host who, in turn, pays the service provider the amount bid by the service provider. In this manner, the promoter can earn more money (i.e., increase their profit) if there is competitive bidding down (i.e., a minimum price a person would accept as compensation for performing or providing the service) by the service providers to provide the service for the least amount of money. Upon completion of the service rendered by the service provider, the promoter and/or host pays into the service provider's account the amount bid by the service provider (e.g., $0.50 per minute for a call or $5 for a bouquet of roses) and the promoter and/or host keeps the profit (e.g., $1.50 per minute for the call or $15 for the bouquet of roses). This allows the customer to gain access to the service provider bidding the cheapest available price for the desired service. The potential service providers are only paid by the promoter and/or host when a potential customer contact is actually received or the goods or services provided to the customer. This removes many of the uncertainties associated with listing one's telephone number in a telephone directory or paying an Internet advertiser for "hits".

With reference now to FIG. 5, the contact routing system and process is first established. Although the owner to the rights to the invention could serve as a host nationwide, or even in a given geographic area, more typically, promoters are used to create accounts in the system (500). That is, the promoter may negotiate in order to have a certain geographic territory or a certain type of service provider. The promoter would create an account with the host or owner of the system of the present invention, such as by using the Internet, by telephone or even by mail. The process of the present invention gives the promoter the ability to create a system that can route customer contacts to various service providers based on how the promoter designs the contact routing business.

Once the promoter's account is created, the promoter may deposit money into the account. This may be done by sending in a check or money order, or providing a credit card such that a credit is established with the host. Alternatively, no money needs to be deposited into the promoter account, but rather the promoter can pay the host on a periodic basis, such as monthly for the contacts which have been received and the revenue share generated by the service provider accounts.

The promoter may establish a maximum bid amount or fee that a service provider will be paid to be included in the system on a contact list (502) as the promoter and/or host will need to determine a minimum profit they are willing to accept on for connecting the customer with the service provider. In order to maximize profit, the promoter and/or host seeks service providers that will charge the lowest to provide the goods and/or services advertised by the promoter and/or host.

The promoter then establishes whether the received contacts are to be answered by a voice prompt, directly routed to a service provider, or a combination thereof (504). In the case of telephone call contacts, preferably, either the promoter or the host owns a telephone number which is suggestive of a group of service providers. Even more preferably, the telephone number is a toll-free telephone number, such as a 1-800 or 1-866 telephone number. For example, the telephone number may be 1-800-PLUMBER, 1-800-FLOWERS, 1-800-LAWYERS, etc. Typically, the promoter will advertise the telephone number or other contact information and system service, such as in its geographic area, so that both potential service providers and customers will become aware it. Such advertising can take place on the Internet, telephone directories, on bill boards, mass mailers, etc. Thus, service providers do not need to have the sophistication or pay the fees necessary to have an Internet presence, and potential customers do not need to own a computer and have Internet access in order to become aware of the contact information for the group of service providers belonging to the system. A suggestive toll-free number would be most desirable as the potential consumers would readily remember such telephone numbers and not need to reference any additional materials when that service is needed, but instead contact the number from memory. However, the telephone numbers need not be toll-free nor suggestive. It will also be appreciated that the contact information can comprise information other than telephone numbers, such as a web-site address, an e-mail address, or by any other means. For example, satellite-enabled communication is increasingly available to customers. One of the more well-known types of this communications is the OnStar™ service, wherein vehicle drivers or passengers can press a button and be placed in contact with an OnStar™ operator, who currently provides accident or repair assistance, driving directions and the like. Implementing the present invention, the vehicle driver or passenger could request a restaurant in a given geographic location, a hotel, a mechanic, etc.

If the promoter establishes that the contacts are to be answered via voice prompt, the promoter designs a unique prompting menu to suit the specific business requirements (506). For example, if a potential customer were to call 1-800 LAWYERS, a prompting menu may prompt the potential customer to select an area of law, such as intellectual property, real estate, family law, or criminal law. The system could be designed so as to either receive such selection by speech recognition, or by prompting the potential customer to press a certain number or button on the telephone key-pad. The prompting menu is typically provided to the customer immediately upon calling the telephone number before the contact is routed to a service provider, but can be provided after a contact is routed in order that certain information may be obtained by the particular service provider before taking the telephone contact.

Alternatively, or additionally, when a potential customer originates a contact, the system is designed such that the caller is identified by the contact identification, which includes the customer's telephone number (508). In this manner, the system can detect the geographic location of the customer contacting and determine an appropriate service provider contact list, such as one based on geographic location.

The system may also be designed with both, such that when the caller identification is blocked (510) other measures can be taken to determine location such as initiating a voice-prompt, connecting the contact with a customer service representative, etc.

Once the promoter and/or host has established the menu driven software, the promoter advertises the contact routing system service. As discussed above, the promoter advertises the telephone number to potential customers and service providers (512). In such a manner, a service provider desiring to belong to the system can call to add themselves on various contact lists in order for customer contact to be directed to them (514). Of course, the service providers can also contact the promoter or host in different ways, such as by visiting a web-site, calling the promoter mailing or faxing a registration form to the promoter or host, etc. As will be more fully discussed herein, the customer also contacts a unique telephone number or other contact means in order to be directed to a service provider (516), as will be more fully described in FIG. 6.

The service provider first creates a new account with a promoter and/or host (600), as seen in FIG. 6. The account, at a minimum, will identify the service provider and include contact information such as a telephone number, e-mail address, etc., for which contacts can be directly provided to the service provider. The promoter and/or host only deposits funds into the service provider account such as by credit card, check, etc. after a contact has been made between the customer and the service provider and the goods and/or services provided to the customer.

After establishing an account, the service provider selects which contact list to join (602). The system may be designed such so that the geographic location of the service provider automatically associates it with a particular contact list. In other instances, there may be no geographic territory limitation whatsoever and thus the service provider is available on a nation-wide or state-wide contact list. The service provider may have multiple offices such that the service provider can select multiple contact lists representing the multiple geographic locations in which its offices are located. Furthermore, the service provider may in fact offer more than one type of service. For example, if the service provider is a law firm, the law firm may provide representation in criminal law, real estate, litigation, etc., and thus be eligible for multiple contact lists even within a single geographical location. The service provider may also be able to bid different amounts for different geographical locations. That is, belonging to a particular contact list may be more valuable then belonging to other contact lists, such as when the geographic location is a metropolitan area, when the contact list is more specifically defined, such as a particular city versus a valley or county, etc.

The service provider then chooses the minimum they will charge to provide the goods and/or service, based upon an established minimum, maximum and/or a current market price (604) The promoter and/or host will list the service providers from those charging the lowest to those charging the highest (at or below a maximum cap established by the promoter and/or host) with highest priority on the contact list given to the service provider with the lowest charge to perform the service and/or provide the goods. Typically, a per-contact received or transaction charge is established by the promoter and/or host to charge the customer. The promoter and/or host establishes a flat fee to charge the customer for the contact or transaction or charges the customer a variable fee based upon the service provider's bid. This would be a minimum per-contact charge for a service provider contact received by a customer. For example, this may be established as being one dollar per contact or a fixed percentage of the service provider's bid. For example, the promoter and/or host lists goods and/or services at a certain price and/or rate (e.g., $10/hour). The service provider is paid according to their bid (e.g., $7/hour, performing 2 hours of work in order to obtain $14). The promoter charges the customer more than the service provider is bidding. If the customer decides not to obtain the goods and/or services from the service provider, the customer may still be charged a fee (flat or variable) for the contact established between the customer and the service provider.

In a particularly preferred embodiment of the invention, the service providers are able to bid against one another for a "lowest" bid per contact or transaction amount. The service provider can then view not only the minimum established per-contact listing fee, but also the minimum or lowest bid on the contact list. The service provider can also call a telephone number, such as a customer service number or the like to retrieve this information as well. As will be more fully described herein, the contact lists are ranked from lowest bidder to highest bidder and the customer contact is routed accordingly. Thus, the market price that the service providers are willing to be paid in order to be ranked lowest (in terms of cost to the promoter and/or host) and potentially receive the most customer contacts may be much lower, such as two dollars or even less per contact than the contact fee charged the customer by the promoter, such as ten dollars. The service provider is able to, at this point, select the minimum amount they will accept as payment for the goods and/or services they provide and bid against the others in the contact list. The service provider can choose to be paid the lowest bid amount to move to first position or be paid a higher bid amount which will place them in lower priority on the list. The highest amount of money that a service provider can select is the established maximum bid amount. The service provider is never charged by the promoter and/or host for a contact from a customer, rather the customer pays the host or promoter.

The invention contemplates that certain service providers may hold regular business hours such as 8:00 a.m. to 5:00 p.m., and thus customer contacts will not be routed to that service provider before 8:00 a.m. or after 5:00 p.m. The system can be designed such that the service provider can place a bid for a certain time of day, such that, for example, contact received between 8:00 a.m. and Noon, receive the lowest bids, while those contact received in the afternoon receive higher bids, and the service provider is able to put a no bid for non-business hours. Additionally, or alternatively, the service provider can indicate which days of the week and what hours of the day the service provider is available to receive contacts, such that customer contacts are not routed to a service provider who is not available.

Each service provider is permitted access to its account by logging on through the Internet, by telephone, etc. Preferably, the accounts are available through the Internet, such that the information is completely available to the service provider on the provider's or host's web-site (606). If the log in is not successful, a customer service representative can assist the service provider, or the password can be electronically mailed to the service provider (608).

Once the service provider successfully logs into the account, it can deduct funds from the account, determine its current ranking, increase or decrease its bid amount per-contact, check on account balance, check on historical charges and contact, and otherwise check on the account status (610). Thus, the amount per-contact charge bids are preferably constantly able to be altered, and not just upon registration of the account. In this manner, service providers can change their rank in the contact list and the free market will determine the lowest price per-contact or transaction received, maximizing the promoter or host revenue and granting some degree of control to the service providers on the number of contacts received. The service provider can arrange for funds to be deducted from its account by the promoter and/or host paying the service provider by check, electronic transfer of funds into the service provider's bank account or the like.

There may be a question of whether or not the service provider wishes to remain on the contact list (612). If a service provider wishes to be removed from the contact list, the service provider is moved from the contact list (614). Notice is sent (616) to the service provider to determine if they want to be placed back on the contact list (618). If the service provider does not want to be placed back on the contact list, a message is sent to the service provider indicating how many customers were directed to other service providers during this time in order to persuade the service provider to register with the system again (620). The message is sent to the service provider periodically (622). If the service provider does want to be placed back on the contact list, the service provider is given the minimum or lowest bid to provide goods and/or services and asked to enter a new bid amount or select the established minimum bid amount (624). However, the service provider is never able to bid higher than the amount listed by the promoter and/or host for the goods and/or services (626). The service provider is then placed back on the list (628) if the service provider does not bid higher than the amount charged the customer by the promoter and/or host. Once back on the contact list, the service provider is routed customer contacts in accordance with the present invention.

If the service provider's bid is higher than the amount charged by the promoter and/or host to the customer for the goods and/or services, the service provider is prompted to re-bid in order to be placed on the contact list (624). Alternatively, the promoter may keep the service provider in an inactive open account. In an active, open account, the service provider may be paid on a periodic basis, such as a monthly cycle, whatever funds are in the account. The service provider remains on the contact list even if the are no funds in the account.

As mentioned above, the service provider is permitted access to its account and can periodically deduct funds as necessary and determine its current ranking and increase its bid amount. If the service provider wishes to remain on the contact list, they remain on the list (630). If a new service provider or an existing service provider on the contact list makes a lower bid so as to move into a position ahead of the service provider in terms of priority on the contact list or the highest ranking position on the contact list in terms of having the lowest bid for providing the goods and/or services (632), a message is sent to the service provider informing it of its change in position (634). As will be appreciated by those skilled in the art, the message may be sent automatically by electronic mail, instant messaging, telephone voice mail messaging, etc. The service provider is prompted to log onto its account in order to decrease its bid amount in order to change its position on the contact list or do nothing and keep the lower position of priority in terms of charging a higher amount to provide the goods and/or service (636). As part of the message to the service provider, the service provider may be given the current minimum bid amount and asked to enter a new bid amount (638). For example, when registering, the service provider may provide an bank account number which can be automatically deposited into by the promoter or host per instructions of the service provider. A speech recognition or window-driven portion of the message to the service provider may provide a menu in which the service provider can opt to transfer additional funds from its account with the promoter and/or host into its bank account. In this manner, the service provider is not required to log into its account in order to accomplish this task. The automated system can then inform the service provider of the balance of the account, and the new minimum bid by the service provider. Such steps can be conducted with an interactive speech recognition driven menu, if a telephone message is directed to the service provider or if the service provider contacts a promoter's or host's customer service number, or can be accomplished through electronic mail, instant messaging, or by logging onto the service provider's account. Of course, it will be appreciated that the promoter or host may employ operators or customer service representatives who can receive a response to account requests by service providers, as well as assisting customers.

With reference now to FIG. 7, the process for routing a customer originated contact in the form of a telephone call is illustrated. A potential customer calls the telephone number, which is preferably a toll-free number as described above, but also may be local or long distance number, or even a special number such as a 1-900 number, or any other appropriate telephone number (700). The system then determines if the number is menu assisted, or needs menu assistance (702). As outlined above, VOIP is another route for customers calling into the network. Customers can also be connected to the service providers by VOIP, as well. While calls can be routed through the PSTN, routing need not be done through the PSTN at all or only one part of the call is routed through the PSTN (e.g., customer calls using PSTN, but routed through to the service provider using VOIP). 1 If the system is set up so as to identify the caller's geographical location by caller identification (704) then the call is automatically routed to the service provider in the first, or highest ranked bidder, position in the call list (706). In those instances where there is no geographic limitation, the call can be automatically routed without identifying the caller's telephone identification by simply routing the call to the service provider in first position on the call list.

If the number is menu assisted, such that the caller identification is blocked, or the system has been designed so as to be menu driven, the customer is prompted or asked to select customer service, such by depressing the "zero" button on the telephone keypad or by speaking into the telephone. The prompting, as discussed above, may be directed to the geographic location of the customer, or the geographic location of the service to be provided. In such instance, the customer can, by speech recognition or keypad entry, enter the area code, zip code, city, state, etc. In the event that the prompt is not directed to geographic location, but to some other selection, such as type of service, the customer is asked to make that selection either by speaking into the telephone or by depressing a key on the telephone keypad (708). For example, the customer may be asked what kind of car they want to rent. The customer can select between luxury, compact, mini-van, etc. This may occur before the call or after the call is routed and before the service provider answers the telephone as discussed above (710).

If the customer has difficulty with the menu selection, the customer can dial "zero" for customer service (712) or otherwise request customer service such as by speaking into the telephone wherein a customer service representative will route the call (714) to the service provider in first position on the call list (706). However, if a customer does not select customer service, but is instead prompted to a list of questions on the menu, the system decides where to route the call (716), which is the service provider in first position on the appropriate call list (706) or to a service provider the customer has had previous contact with. There are many different ways of routing that take into account multiple factors such as calls missed, satisfaction rating, bid (minimum rate/amount), length of calls, etc. to determine how the call is routed. Additionally, it is a possibility to provide an audio list of ordered service providers presented to the customer. This last may be based on an algorithm based on the aforementioned criteria. Moreover, a round robin method of selecting service providers could be incorporated into the routing process. In addition, a certain percentage of calls can be sent to the highest priority bidding service provider (i.e., the lowest bidder), a certain percentage of calls sent to the service provider with the next highest priority, etc.

The present invention also contemplates a "search engine" which is an automated telephone system similar to dialing a 411 operator. In this embodiment, there are many different industries or service providers which have bids in a higher rank to receive calls for their industry and/or selected geographical locations. The customer will call a telephone number needing a phone query. The customer can then be routed as described herein, or by selecting a particular industry or need by speaking into the phone or entering information into the phone by the key pad or the like.

Once the call is routed to the service provider in the highest ranking first position on the call list, the service provider must answer the call within a specified number of rings, such as three or four rings (718). If they do not, the system may prompt the customer to "please wait, while you are being connected" (720), while the call is routed to the next waiting service provider on the call list (722). In this manner, if a service provider is on another telephone call or is on vacation or the like, the customer is routed to a service provider immediately without having to leave a message. This enables service providers that are not the highest ranked service provider on the call list to receive calls as well. However, it will be appreciated that the highest ranking service provider will receive the larger number of customer calls.

However, if the service provider answers the call within a specified number of rings (718), that service provider is either presented with a live customer call, or the system may be devised such that the service provider is offered a message from the automated system, for example, "press 1 to accept", "2 to reject calls", or the service provider is asked to voice their acceptance or rejection which will be interpreted by speech recognition software or the like (724). If the service provider rejects the call (726), the service provider may be removed from the calling list and the customer is not charged by the billing server (728). Alternatively, the system may be devised such that the service provider is not removed from the call list, but instead can selectively accept or reject calls until the service provider closes its account. In any event, the system will route the call to the next highest ranking service provider on the call list (722), where the highest rank can be determined from any number of factors described above (e.g., calls taken, customer satisfaction, lowest bid, etc.).

If the highest ranking service provider accepts the call, either by expressly stating or pressing a button to accept the call or merely answering the telephone call (730), the call is established and registered into the billing server (732). The service provider's "bid amount" that the service provider previously bid per-call is credited to the account of the service provider upon completion of the provision of goods and/or services (734). Preferably, the per-call charge bid amount is automatically credited to the account of the service provider. The fee is collected from the customer by the promoter (736) who makes a profit on the difference between the fee collected from the customer and the amount paid to the service provider by the promoter for providing the goods and/or services to the customer.

Although the above-provided description relating to FIG. 7 has been directed to a customer originated contact in the form of a telephone call, such as a cell phone or plain old telephone service "land line" call, the present invention is not necessarily limited to such. As described above, other forms of routing besides telephonic calls are contemplated. Live voice conversations can be conducted through Internet or VOIP links, a satellite-enabled up-link (such as OnStar™), automated dialers, which include preprogrammed telephone or contact numbers, part of another system that does not require the potential customer to dial an actual telephone number. Dynamic routing of non-voice customer contacts, such as electronic messages, including text messages, SMS messages, e-mail messages, and the like, are also contemplated by the present invention. For example, an e-mail originated customer contact or request may be routed to the pertinent service provider's e-mail address, telephonic device, SMS device, or the like. Similarly, an SMS or text message originated customer request can be routed to the service provider's SMS device, telephonic device, or the like. The service provider can respond by electronic message, or otherwise contacting the potential customer, such as by telephone. Similar steps illustrated in FIG. 7, could apply to each of these types of communication contacts originated by the customer and routed to a service provider who receives a response to the customer request.

It is contemplated by the invention that the promoter, when designing the system can create a scoring system that will rate the satisfaction or value of the service provider by past customers. Such information can be used in a variety of ways, such as enabling the customer to select a "four star" or "highest rated" service provider, requiring service providers with low scores to pay a higher minimum bid fee or even terminate their participation in the system so as to maintain customer confidence in the system. A quality control mechanism is employed for providing the service provider with feedback and/or providing the host with feedback about the service provider from the customer. The customer, either at the end of a call or during a follow-up call from the host at a later date or time, can electronically or manually (via keypad) rate the service provider in order to ensure quality control and help determine the quality variable for routing calls. Alternatively, customers may be recorded during calls for quality control purposes.

Typically, the promoter will have a contractual obligation with a host or owner of the intellectual property of the system, such that either a flat fee is paid to the host by the promoter upon establishing the system, for each new registered service provider, or a portion of each per-contact charge is split by the promoter and the host/intellectual property owner. This can be done on a periodic basis by billing or sending out a statement account balance or the like, or the promoter account can be automatically increased in amount for each charged contractor the like. The invention contemplates that either the promoter can directly deal with the service provider accounts, and pay the host on a periodic basis, or the host can maintain the system and receive the charges from the service provider directly, and pay the promoter the agreed to share on a periodic basis.

It will be appreciated by those skilled in the art that the present invention allows service providers the ability to advertise their services dependent on an as-needed basis, and thus pay for advertisement only when they need work and to bid to be in a position to receive a greater number of contacts. Customers are directly routed to a service provider who is able to respond to their request immediately, without the need for the time consuming and tedious process of looking for a particular service provider in a telephone directory or on the Internet.

The present invention also allows promoters the ability to build a viable business to provide dynamic contact routing to various business/service providers while modifying the routing system to fit specific business requirements.

Although several embodiments have been described in detail for purposes of illustration, various modifications may to each be made without departing from the scope and spirit of the invention. Accordingly, the invention is not to be limited, except as by the appended claims.

What is claimed is:

1. A process for dynamic routing of customer contacts to service providers, comprising the steps of:
   - establishing accounts in a service provider contact system for a plurality of service providers;
   - permitting the plurality of service providers to bid against one another for providing goods and/or services to a customer;
   - creating a contact list comprised of the service providers geographically independent of servicing the contact and ranked from a lowest bidder service provider to a highest bidder service provider;
   - receiving a live telephone contact from the customer;
   - routing the live telephone contact from the customer for a live conversation with the lowest bidder service provider on the contact list; and
   - crediting the service provider account receiving the contact the amount bid by the service provider.

2. The process of claim 1, wherein the contact comprises a live conversation via a real-time communications link.

3. The process of claim 2, wherein the real-time communications link comprises a telephonic link, a voice over internet protocol link, a satellite-enabled voice link, or an audio visual link.

4. The process of claim 1, wherein the contact comprises a customer originated electronic message.

5. The process of claim 4, wherein the electronic message comprises a text message, a SMS message, or an email message.

6. The process of claim 1, including the step of rerouting the customer contact to a next lowest bidder service provider on the contact list if the lowest bidder service provider does not respond to the customer contact.

7. The process of claim 1, including the step of notifying a service provider when its bidding ranking has changed.

8. The process of claim 7, including the step of permitting the service provider to enter a new bid.

9. The process of claim 1, wherein the account establishing step includes the step of permitting the service providers to select one or more contact lists.

10. The process of claim 1, wherein the contact list creating step includes the step of creating contact lists based on geographic location of the service provider.

11. The process of claim 10, wherein the contact routing step includes the step of determining the geographic location of the customer, and selecting a contact list based on that geographic location.

12. The process of claim 11, wherein the determining the geographic location step is derived by means of customer-provided geographic information, customer telephone caller identification, GPS-assisted location, triangulation, operator-assisted location, or cell phone company-assisted location.

13. The process of claim 12, wherein the geographic location determining step includes the step of prompting the customer to provide geographic location information to route the customer to a service provider contact list with a corresponding geographic location.

14. The process of claim 13, wherein the customer provides geographic location information by means of speech recognition or keypad entry.

15. The process of claim 1, including the step of prompting the customer to make a selection to determine how to appropriately route the customer contact.

16. The process of claim 15, wherein the customer selection is accomplished in an automated fashion using speech recognition or keypad entry.

17. The process of claim 1, including the step of establishing a maximum bid from the service providers.

18. The process of claim 1, including the step of making available to service providers their fund account status.

19. The process of claim 1, including the step of notifying a service provider about its account balance.

20. The process of claim 1, including the step of billing the customer for the goods and/or services provided by the service provider.

21. The process of claim 1, wherein the crediting step includes the step of paying the service provider on a periodic basis.

22. The process of claim 1, including the step of permitting a service provider, to whom the customer contact is routed, to accept or reject the contact.

23. The process of claim 22, wherein the acceptance or rejection occurs by speech recognition or keypad entry.

24. The process of claim 22, including the step of rerouting the customer contact to the next lowest bidder service provider on the contact list, if the lowest bidder service provider does not accept the contact.

25. The process of claim 1, including the step of permitting the service providers to set time periods of contact acceptance.

26. The process of claim 1, including the step of using a promoter to advertise the service provider contact system to customers and obtain service provider accounts.

27. The process of claim 26, wherein a system host and the promoter share the amount charged to the customer.

28. The process of claim 1, wherein the receiving step includes the step of selecting goods and/or services to generate the contact.

29. A process for dynamic routing of customer contacts to service providers, comprising the steps of:
 establishing accounts for a plurality of service providers;
 permitting the plurality of service providers to bid against one another for providing goods and/or services to a customer;
 creating a contact list of the service providers, wherein the service providers are geographically independent of servicing the contact and ranked from the lowest bidder service provider to the highest bidder service provider;
 receiving a live telephone contact from the customer;
 routing the live telephone contact from the customer for a live conversation with the service provider with the lowest bid on the selected contact list;
 rerouting the customer contact to a next lowest bidder service provider on the selected contact list if the lowest bidder service provider does not respond to or rejects the customer contact;
 notifying a service provider when its bidding ranking has changed;
 permitting the service provider to enter a new bid;
 billing the customer for the goods and/or services received from the service provider; and
 crediting the service provider account receiving the contact the amount bid by that service provider.

30. The process of claim 29, wherein the customer contact is received via a real-time communications link comprising a telephonic link, a voice over internet protocol link, a satellite-enabled voice link, or an audio visual link.

31. The process of claim 29, wherein the account establishing step includes the step of permitting the service providers to select one or more contact lists.

32. The process of claim 29, wherein the contact list creating step includes the step of creating contact lists based on geographic location of the service provider.

33. The process of claim 32, wherein the contact routing step includes the step of determining the geographic location of the customer, and selecting a contact list based on that geographic location.

34. The process of claim 33, wherein the geographic location of the customer is determined by means of customer-provided geographic information, customer telephone caller identification, GPS-assisted location, triangulation, operator-assisted location, or cell phone company-assisted location.

35. The process of claim 33, wherein the geographic location determining step includes the step of prompting the customer to provide geographic location information to route the customer to a service provider contact list with a corresponding geographic location.

36. The process of claim 29, including the step of prompting the customer to make a selection to determine how to appropriately route the customer contact.

37. The process of claim 29, including the step of establishing a maximum bid for each contact received.

38. The process of claim 29, including the step of making available to or notifying service providers their fund account status.

39. The process of claim 29, wherein the crediting step includes the step of paying the service provider on a periodic basis.

40. The process of claim 29, including the step of permitting the service providers to set time periods of contact acceptance.

41. A process for routing of customer contacts to service providers, comprising the steps of:
 establishing accounts for a plurality of service providers;
 permitting the plurality of service providers to bid against one another for providing goods and/or services to a customer;
 creating a contact list of the service providers, wherein the service providers are geographically independent of servicing the contact and ranked from the lowest bidder service provider to the highest bidder service provider;
 receiving a live telephone contact from the customer;
 providing the list of service providers to the customer;
 routing the live telephone customer for a live conversation with a service provider selected by the customer from the contact list;
 notifying a service provider when its bidding ranking has changed;
 permitting the service provider to enter a new bid;
 billing the customer for the goods and/or services received from the service provider; and
 crediting the service provider account receiving the contact the amount bid by that service provider.

42. The process of claim 41, including the step of rerouting the customer contact to a next lowest bidder service provider on the selected contact list if the lowest bidder service provider does not respond to or rejects the customer contact.

43. The process of claim 41, wherein the customer contact is received via a real-time communications link comprising a telephonic link, a voice over internet protocol link, a satellite-enabled voice link, or an audio visual link.

44. The process of claim 41, wherein the contact list creating step includes the step of creating contact lists based on geographic location of the service provider.

45. The process of claim 44, wherein the contact routing step includes the step of determining the geographic location of the customer, and selecting a contact list based on that geographic location.

46. The process of claim 45, wherein the geographic location of the customer is determined by means of customer-provided geographic information, customer telephone caller identification, GPS-assisted location, triangulation, operator-assisted location, or cell phone company-assisted location.

47. The process of claim 41, including the step of establishing a maximum bid for each contact received and only listing service providers that have bid below the maximum established bid.

48. The process of claim 41, including the step of making available to or notifying service providers their fund account status.

49. The process of claim 41, wherein the crediting step includes the step of paying the service provider on a periodic basis.

50. The process of claim 41, including the step of permitting the service providers to set time periods of contact acceptance.

* * * * *